(12) United States Patent
Yamasaki

(10) Patent No.: US 7,963,716 B2
(45) Date of Patent: Jun. 21, 2011

(54) PIN CONNECTION DEVICE

(75) Inventor: Takanori Yamasaki, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 331 days.

(21) Appl. No.: 12/161,764

(22) PCT Filed: Dec. 8, 2006

(86) PCT No.: PCT/JP2006/324575
§ 371 (c)(1),
(2), (4) Date: Jul. 22, 2008

(87) PCT Pub. No.: WO2007/088674
PCT Pub. Date: Aug. 9, 2007

(65) Prior Publication Data
US 2010/0226710 A1    Sep. 9, 2010

(30) Foreign Application Priority Data

Feb. 1, 2006  (JP) .................................. 2006-024609

(51) Int. Cl.
*E02F 3/28* (2006.01)
(52) U.S. Cl. .......... 403/322.1; 403/31; 414/723; 37/468
(58) Field of Classification Search .................... 403/31, 403/161, 322.3; 414/723; 37/468
See application file for complete search history.

(56) References Cited

U.S. PATENT DOCUMENTS

| | | | | | |
|---|---|---|---|---|---|
| 4,286,350 A | * | 9/1981 | Ichise | ......................... | 15/250.32 |
| 5,010,962 A | * | 4/1991 | Bloom, Jr. | ..................... | 172/430 |
| 5,125,788 A | * | 6/1992 | Stenger | ......................... | 414/723 |
| 5,553,962 A | * | 9/1996 | Eustache | ......................... | 403/154 |
| 5,802,753 A | * | 9/1998 | Raunisto | ......................... | 37/468 |
| 5,865,594 A | * | 2/1999 | Kim | ............................ | 414/723 |
| 6,132,131 A | * | 10/2000 | Nakamura et al. | ......... | 403/322.1 |
| 6,231,296 B1 | * | 5/2001 | Blomgren | ..................... | 414/723 |
| 6,332,747 B1 | * | 12/2001 | Lee | ............................ | 414/723 |
| 6,385,872 B1 | * | 5/2002 | Mieger et al. | ................... | 37/468 |
| 6,499,904 B2 | * | 12/2002 | Nye | .............................. | 403/31 |
| 6,513,268 B2 | * | 2/2003 | Lee et al. | ........................ | 37/468 |
| 6,662,681 B2 | * | 12/2003 | Crane et al. | .................. | 74/571.1 |
| 7,032,335 B2 | * | 4/2006 | Short | .............................. | 37/468 |
| 7,690,880 B2 | * | 4/2010 | Honeyman et al. | ........... | 414/723 |

FOREIGN PATENT DOCUMENTS

| | | |
|---|---|---|
| DE | 196 51 507 A1 | 7/1997 |
| JP | 9 511294 | 11/1997 |
| JP | 3399960 | 2/2003 |
| JP | 2005 249185 | 9/2005 |

* cited by examiner

*Primary Examiner* — Joshua T Kennedy
(74) *Attorney, Agent, or Firm* — Oblon, Spivak, McClelland, Maier & Neustadt, L.L.P.

(57) ABSTRACT

Assembly of a pin guide member for retaining a pair of connecting pins is facilitated for improvement in an assembling property and cost reduction. On the premise that inner brackets are overlapped with outer brackets, and pins are inserted into pin holes thereof so as to connect the brackets to each other, inner collar portions of pin guide members for retaining the pins are combined and integrated with each other by bolts and nuts through a supporting plate serving as a connection member. Meanwhile, outer collar portions of both the pin guide members are supported in the pin radial direction with respect to the inner brackets and rotation thereof is prevented.

10 Claims, 11 Drawing Sheets

PIN CONNECTION DEVICE

TECHNICAL FIELD

The present invention relates to a pin connection device for detachably connecting members to each other by pins in various working machines.

BACKGROUND ART

A description will be given to a conventional art taking a cannibalizing machine with an ultra-long attachment used in cannibalizing of a high building as an example.

A base machine A of the above cannibalizing machine is formed by a crawler type lower traveling body 1 and an upper rotating body 2 mounted on the lower traveling body 1 rotatably around a vertical axis as shown in FIG. 9.

A working attachment B provided with a long boom 3 is attached to a front section of the base machine A.

The boom 3 of the working attachment B is formed by connecting a first boom 4, a second boom 5, a third boom 6 and a fourth boom 7 in order from the bottom in which the neighboring booms are connected relatively rotatably around a horizontal axis.

In the boom 3, a lower end of the first boom 4 is attached to the upper rotating body 2 of the base machine A.

A first boom cylinder 8 for raising and lowering the first boom 4 (the entire boom) is provided between the upper rotating body 2 and the first boom 4, a second boom cylinder 9 for raising and lowering the second boom 5 is provided between a front end of the first boom 4 and the second boom 5, a third boom cylinder 10 for raising and lowering the third boom 6 is provided between the second boom 5 and the third boom 6, and a fourth boom cylinder 11 for raising and lowering the fourth boom 7 is provided between the third boom 6 and the fourth boom 7. The cylinders are respectively provided on the lower surface side of the booms.

The entire boom 3 is raised and lowered by the respective boom cylinders 8 to 11, and a bending and stretching action is performed taking connection parts of the respective booms as joints as shown by a broken line in FIG. 9.

In FIG. 9, the reference numeral 12 denotes an openable compression crushing device provided in a front end of the boom 3 (a front end of the fourth boom 7), and the reference numeral 13 denotes a cylinder for compression crushing device adapted to rotate the compression crushing device 12 around the horizontal axis in the up and down direction.

In the case of the above long boom 3, the respective booms 4, 6 and 7 except the short second boom 5 exceed length and weight limitation at the time of transportation as one bloc. Therefore, the respective booms 4, 6 and 7 are divided into a plurality of boom sections, transported and assembled on site.

For example, the first boom 4 is divided into four boom sections Bs of a first (base) boom section, a second boom section, a third boom section and a fourth boom section. Ends thereof opposing to each other are connected to each other by pins.

FIG. 10 shows a state that both the first and second boom sections Bs are connected to each other by pins 14 on both the upper and lower sides.

As mentioned above, a pin connection device for connecting left and right connection portions to each other by separate pins within a narrow clearance of boom width shown in Patent Document 1 is known.

In the above known technique, a pair of hydraulic cylinders are arranged in series having a common piston rod. By performing a stroke operation of cylinder tubes serving as pins in the opposite direction at the same time, both the pins are inserted into and removed from pin holes.

However in the above known technique, since the common piston rod of both the cylinders is supported in a middle part, the entire length of the device is long. Therefore, in the case where the boom width is narrow (a clearance between connection portions on the both sides is narrow), it is difficult to install the device.

Therefore, the following pin connection device is proposed.

As shown in FIGS. 11 and 12, first brackets 15 and 16 serving as a first connection portion are provided on one of the left and right sides of ends of two members (such as both the boom sections Bs in FIG. 10) to be connected to each other. On the other side, second brackets 17 and 18 serving as a second connection portion are provided. First pin holes 19 are provided in the first brackets 15 and 16 and second pin holes 20 are provided in the second brackets 17 and 18.

It should be noted that the figure shows the case where a pair of first brackets 16 on the inside and the outside and a pair of second brackets 18 on the inside and the outside are provided with a small clearance inbetween. However, as a matter of convenience, the brackets 16 and 18 only indicate the brackets on the inside (denoted by the reference numerals 16 and 18 in FIG. 11) in the following description.

The first brackets 15 and 16 and the second brackets 17 and 18 are arranged in a state that the pin holes 19 and 20 thereof correspond to each other as shown in the figure, and the brackets are overlapped inside and outside having the brackets 16 and 18 on the inner side, and connected to each other by a pin connection device 21 provided between the brackets 16 and 18 on the inner side.

Hereinafter, the brackets 16 and 18 are referred to as the inner brackets and the brackets 15 and 17 are referred to as the outer brackets, according to need.

The pin connection device 21 is provided with a first pin 22 for connecting the first brackets 15 and 16 to each other and a second pin 23 for connecting the second brackets 17 and 18 to each other. Both the pins 22 and 23 perform the stroke operation in the opposite direction to each other so as to be inserted into and removed from the pin holes 19 and 20 on the both sides.

FIG. 11 respectively shows a pin insertion state on the right side and a pin removal state on the left side with respect to a center line. Hereinafter, a pin position on the right side of FIG. 11 is referred to as an insertion position and a pin position on the left side is referred to as a removal position, according to need.

Both the first and second pins 22 and 23 are respectively driven by hydraulic cylinders 24. Both the hydraulic cylinders 24 have all the same configuration. Therefore, a description regarding to the cylinder configuration will basically be given only for one side hereinafter, and a separate description will be added for each of the cylinders according to need.

The pins 22 and 23 are integrated with cylinder tubes of the hydraulic cylinders 24. The hydraulic cylinders 24 are formed by the pins 22 and 23, pistons 25 and hollow piston rods (hereinafter, simply referred to as rods) 26 connected to the pistons 25 and extended and contracted by an oil supply and discharge effect from the exterior so that the pins 22 and 23 perform the stroke operation between both the insertion and removal positions.

Both the hydraulic cylinders 24 are formed as separately independent cylinders in which the rods 26 are divided at a center part of the device. Both the cylinders 24 are arranged in series in a state that rod ends thereof opposing to each other support reaction force on the extending side for each other.

Specifically, in the rod ends of both the cylinders 24, reaction force transmitting portions 27 in a circular shape are provided projectingly to the outer peripheral side. Since abutment surfaces 27a serving as surfaces of both the reaction force transmitting portions 27 opposing to each other are brought into abutment with each other in the rod axial direction. Therefore, the reaction force on the cylinder extending side is supported on the respective rod ends.

Meanwhile, on the outer peripheral sides of both the pins 22 and 23, cylindrical pin guide members 28 are provided so that the pins 22 and 23 are retained horizontally and perform the stroke operation between the insertion position and the removal position.

In the pin guide members 28, outer collar portions 28a provided in outer ends thereof are fixed to and cantilevered by the inner brackets 16 and 18. To inner ends (inner collar portions 28b) serving as free ends of the pin guide members 28, supporting plates 29 for receiving reaction force on the cylinder contracting side are attached.

The supporting plate 29 is formed in a half-divided shape with ring bodies 29a and 29b formed in a semicircular shape so as to be attached and detached between the pin guide members 28 on the both sides from the outside in the pin radial direction as shown in FIG. 12.

In a state that the inner peripheral side of the plate 29 is convexly and concavely engaged with an engagement portion 27b provided in an outer peripheral part of an opposite surface to the abutment surface 27a in the reaction force transmitting portion 27, an outer edge part of the above plate 29 is detachably attached to the inner collar portion 28b of the pin guide member 28 by bolts 30.

Thereby, the reaction force on the cylinder contracting side at the time of pin removal is transmitted from the reaction force transmitting portion 27 to the supporting plate 29 and supported in the pin guide member 28.

Meanwhile, oil passages 31 and 32 on the extending side and the contracting side are respectively formed in an axial center part of the rod 26 in a tunnel shape extending in the rod axial direction. Both the oil passages 31 and 32 are linked to a pump circuit and a tank circuit through a pipe joint 33 provided between both the hydraulic cylinders 24 and an external pipe (not shown).

As mentioned above, supply and discharge of oil for the hydraulic cylinders 24 are performed via the rods.

According to the pin connection device 21, the entire length of the device is shortened. Therefore, even in the case where the boom width is narrow (a clearance between the brackets on the both sides is narrow), it is possible to assemble the device.

In the above prior art, the outer ends of the pin guide members 28 are attached to and cantilevered by the inner brackets 16 and 18 as mentioned above. However, there is a problem regarding to attachment of the pin guide members 28 as follows.

A description will be given taking the pin guide member 28 and the inner bracket 16 on the left side in the figure as an example. There is no problem when the outer end of the pin guide member 28 can directly be fixed to the bracket 16. However, since the clearance between the brackets is narrow, it is not possible to process screw holes or the like in the bracket 16.

Therefore, as shown in the figure, a bushing 34 is press fitted to the pin hole 19 of the bracket 16, and a flange 34a is press fitted to an outer periphery of the bushing 34. Then, an outer periphery of the flange 34a is welded to the bracket 16, and the outer collar portion 28a of the pin guide member 28 is fixed to the flange 34a by bolts 35.

Patent Document: Japanese Patent No. 3399960

DISCLOSURE OF THE INVENTION

However, according to the above prior art, first of all, there is a need for a work of fastening both the inner and outer ends of the pin guide member 28 to the supporting plate 29 and the inner bracket 16 (the flange 34a of the bushing 34) by bolts.

In addition, there is a need for a process of press fitting the flange 34a matching with a phase determined by a relationship with the pin guide member 28, a process of welding the flange 34a to the bracket 16, a process of performing difficult machine work on a surface of the inner bracket 16 prior to the above welding and the like.

Furthermore, the welding is a troublesome work of avoiding distortion in a pin hole diameter and a flange combining surface, and there is a need for cleaning up adhered spatter.

Therefore, since the number of process is large, an assembling property is degraded and cost is increased. The device has a significant problem as a mass produced machine.

Consequently, on the premise that a pair of pins are retained by pin guide members and perform a stroke operation so that connection portions of two members are connected to and disconnected from each other, the present invention is to provide a pin connection device capable of realizing improvement in the assembling property and cost reduction regarding to attachment of the pin guide members.

In order to solve the above problem, the present invention adopts the following configuration.

That is, the present invention is provided with first and second connection portions provided in two members to be connected to each other with a clearance therebetween, pin holes provided in both the connection portions, first and second pin guide members provided side by side in the axial direction between both the connection portions located on the inner side in a state that the first and second connection portions of the members are overlapped inside and outside, first and second pins adapted to perform a stroke operation in the opposite direction to each other in a state of being retained by both the first and second pin guide members and move between a connection position to be inserted into both the pin holes of both the first and second connection portions and a disconnection position to be removed from at least the pin holes of the connection portions on the outer side, a connection member provided detachably in the pin radial direction between inner ends of both the pin guide members opposing to each other, fastening means for detachably combining the inner ends of both the pin guide members to each other through the connection member, and supporting means for supporting outer ends of both the pin guide members in the pin radial direction with respect to the connection portions on the inner side.

According to the present invention, the inner ends of both the pin guide members are combined and integrated with each other by the fastening means in a state that the connection member detachable in the pin radial direction is intervened between the inner ends. Therefore, regarding to assembly of the pin guide members, it is possible to omit a troublesome work of press fitting and welding the flange, the machine work on the flange combining surface prior to the above and the like, which are required in the prior art shown in FIGS. 11 and 12.

The outer ends of the pin guide members may only be supported in the pin radial direction. Therefore, it is possible to deal with a simplified structure such as a structure of supporting by the pins themselves (claim 2), and a structure of supporting by simple convexo-concave fitting (claim 3).

Thereby, it is possible to reduce the number of process for the entire assembly of the pin guide members and simplify the work. Therefore, it is possible to realize the improvement in the assembling property and the cost reduction in a mass produced machine.

BEST MODES FOR CARRYING OUT THE INVENTION

Hereinafter, a description will be given to embodiments of the present invention with reference to FIGS. 1 to 8.

First Embodiment (Refer to FIGS. 1 to 4)

Figure 11:
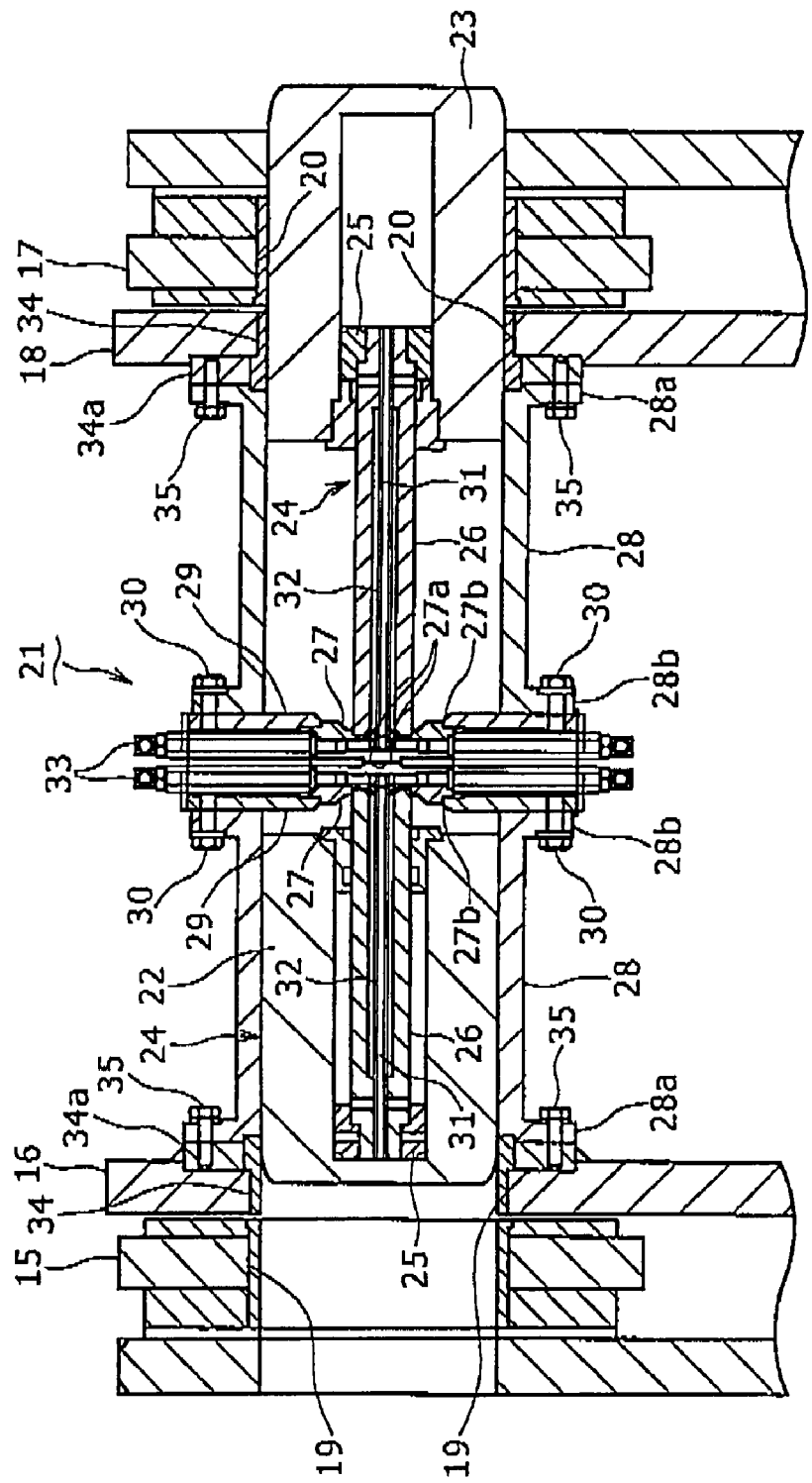
[FIG. 11] A sectional view of a pin connection device according to a prior art of the present invention.
Figure 12:
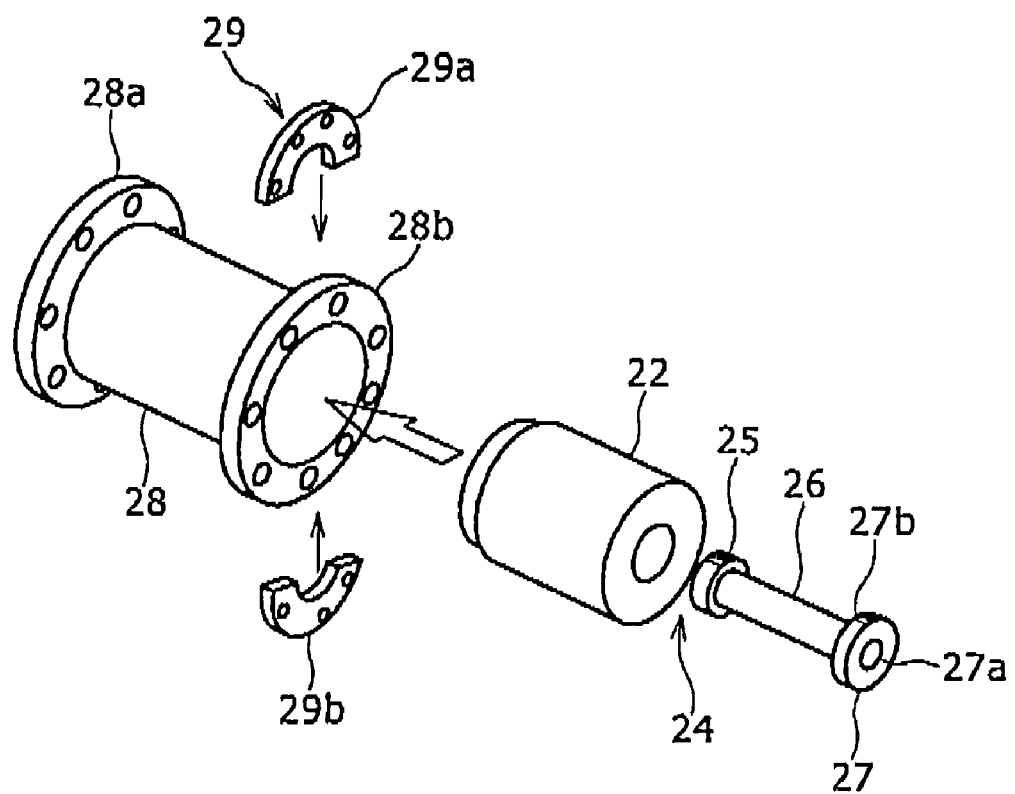
[FIG. 12] A partially exploded perspective view of the above device.

A pin connection device 36 according to a first embodiment is a hydraulic pin type. In the present embodiment, the same parts as the prior art shown in FIGS. 11 and 12 are given the same reference numerals, and a duplicated explanation thereof will be omitted.

As a basic configuration, the following points are the same as the prior art.

Figure 10:
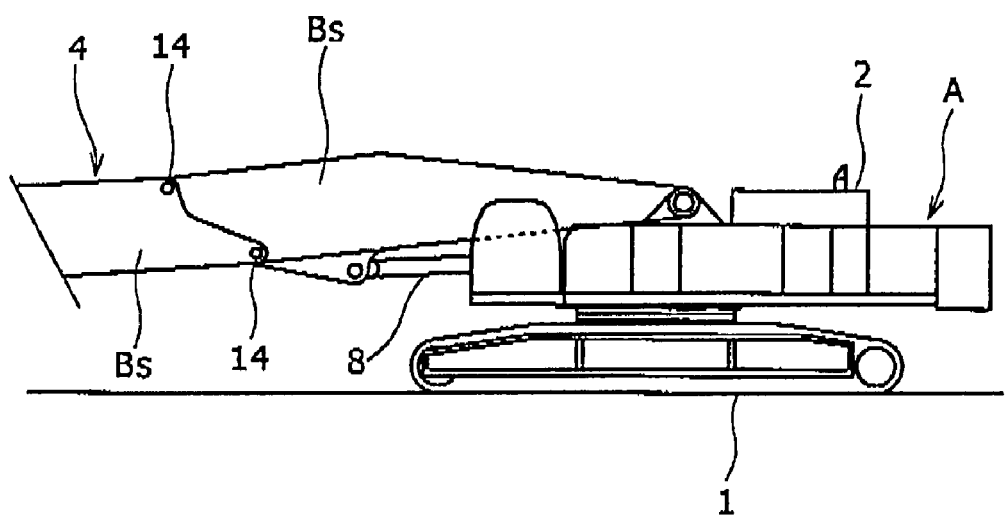
[FIG. 10] A partial side view showing a connection state of boom sections at the time of assembling and disassembling the cannibalizing machine.

(i) First brackets 15 and 16 serving as a first connection portion are provided on one of the left and right sides of ends of two members (such as both boom sections Bs in FIG. 10) to be connected to each other. On the other side, second brackets 17 and 18 serving as a second connection portion are provided. First pin holes 19 are provided in the first brackets 15 and 16 and second pin holes 20 are provided in the second brackets 17 and 18.

(ii) The first brackets 15 and 16 and the second brackets 17 and 18 are arranged in a state that the pin holes 19 and 20 thereof correspond to each other as shown in the figure, and the brackets are overlapped inside and outside having the brackets 16 and 18 on the inner side.

(iii) First and second pins 22 and 23 of the pin connection device 36 are integrated with cylinder tubes of hydraulic cylinders 24. The hydraulic cylinders 24 are formed by the pins 22 and 23, pistons 25 and hollow rods 26 connected to the pistons 25.

(iv) Both the hydraulic cylinders 24 are formed as separately independent cylinders in which the rods 26 thereof are divided at a center part of the device. Reaction force on the cylinder extending side is supported on rod ends thereof opposing to each other through abutment surfaces 27a of reaction force transmitting portions 27.

(v) Oil passages 31 and 32 on the extending side and the contracting side of the cylinder are provided in axial center parts of the rods 26. Both the oil passages 31 and 32 are linked to an external pipe through pipe joints 33.

On the outer peripheral sides of both the pins 22 and 23, cylindrical pin guide members 37 are provided so that the pins 22 and 23 are retained horizontally and perform a stroke operation between an insertion position and a removal position.

In the pin guide members 37, inner collar portions 38 and outer collar portions 39 are respectively provided in inner ends and outer ends thereof projectingly to the outer periphery side. In a state that a supporting plate 40 serving as both a connection member and a member for receiving reaction force on the cylinder contracting side is intervened between the inner collar portions 38, the inner collar portions 38 are combined with each other by bolts 41 and nuts 42 serving as fastening means passing through the above three parts.

The supporting plate 40 is formed in a half-divided shape in which ring bodies 40a and 40b made of a thick plate and formed in a semicircular shape are combined with each other in the radial direction as a mode of integrating the supporting plates 29 on the both sides in the prior art shown in FIGS. 11 and 12. In a state that the inner peripheral side of the supporting plate 40 is convexly and concavely engaged with engagement portions 27b of the reaction force transmitting portions 27 so as to transmit the reaction force on the cylinder contracting side to the pin guide member 37, an outer edge part of the above plate 40 is combined with the inner collar portions 38 of the pin guide members 37 as mentioned above.

Thereby, both the pin guide members 37 are combined and integrated with each other through the supporting plate 40 in the inner ends thereof.

It should be noted that a joint hole 43 passing through in the radial direction is provided inside the supporting plate 40. The pipe joints 33 are inserted and accommodated in the joint hole 43.

In outer peripheral ends of both left and right surfaces of the supporting plate 40, engagement edge portions 44 outwardly projecting are provided. The engagement edge portions 44 are engaged with outer peripheries of the inner collar portions 38 of the pin guide members 37. Thereby, the above plate 40 is positioned (centered) in the radial direction.

Further, pin rotation preventing members 45 are attached to base ends of both the pins 22 and 23 projectingly to the outer periphery side. The pin rotation preventing members 45 are engaged with rotation preventing grooves 46 provided in inner peripheral surfaces of both the pin guide members 37 extending in the axial direction. Thereby, rotation of both the pins 22 and 23 around the center is prevented.

Next, a description will be given to a structure for supporting the outer ends of the pin guide members 37 in the pin radial direction and fixing positions thereof (preventing rotation) in the circumferential direction.

Fitting concave portions 47 are provided over the entire periphery on the inner periphery side of outer end surfaces of the pin guide members 37. Meanwhile, bushings 48 with heads are press fitted and fixed to the pin holes 19 and 20 of the inner brackets 16 and 18. The fitting concave portions 47 of the pin guide members 37 are fitted to the heads of the bushings 48 in the axial direction.

Thereby, the pin guide members 37 are supported in the pin radial direction. That is, supporting means for supporting the pin guide member 37 in the radial direction is formed by the bushing 48 and the fitting concave portions 47.

Both the first and second pins 22 and 23 are removed from the pin holes 19 and 20 of the outer brackets 15 and 17 in a disconnection (pin removal) state, while still inserted and retained in the pin holes 19 and 20 of the inner brackets 16 and 18. In other words, related size such as pin length, sliding stroke and length of the pin guide member 37 is set so as to obtain the above state.

As mentioned above, both the pins 22 and 23 and the pin holes 19 and 20 also function as the supporting means for supporting the pin guide members 37 in the radial direction.

Figure 1:
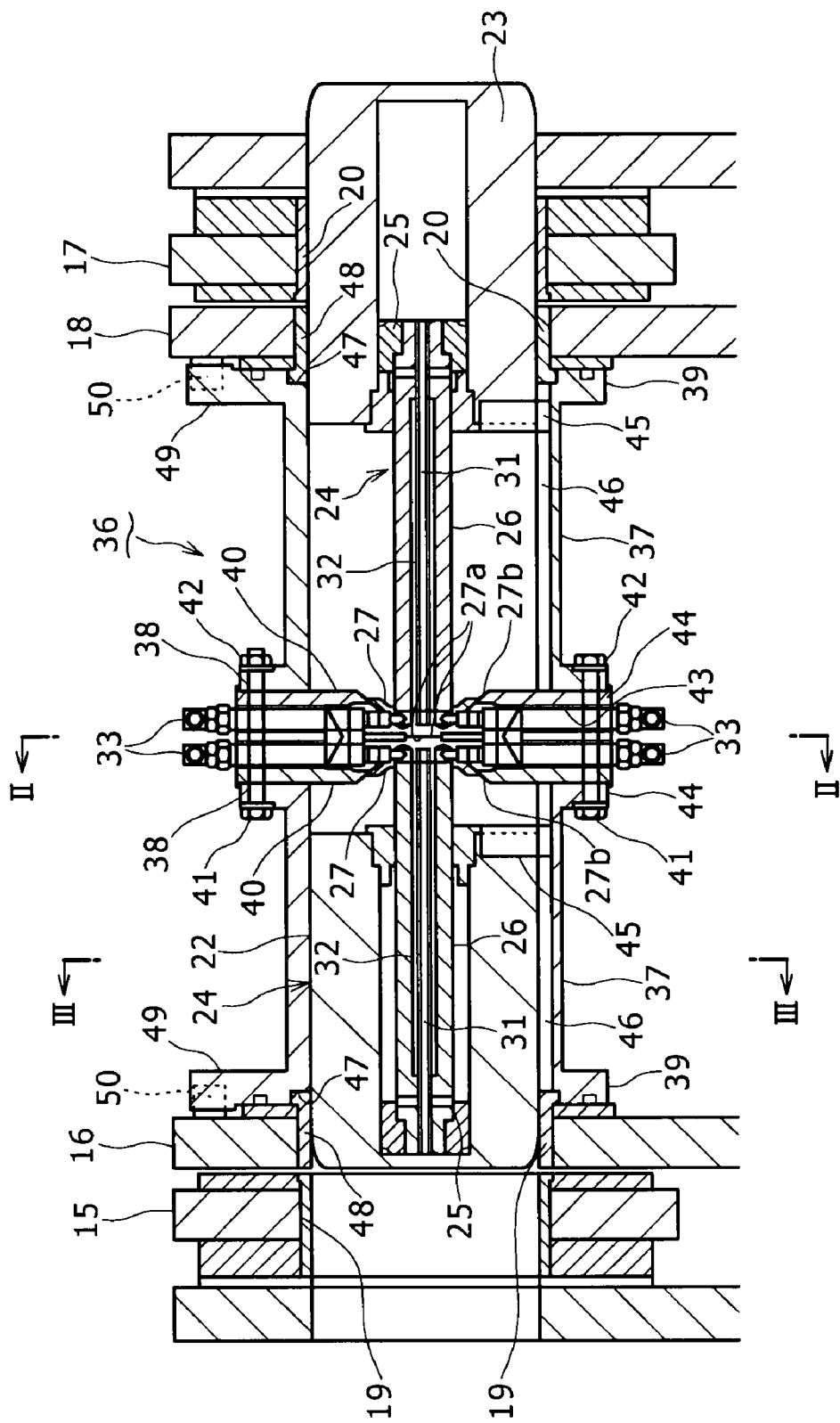
[FIG. 1] A sectional view of a pin connection device according to a first embodiment of the present invention.
Figure 2:
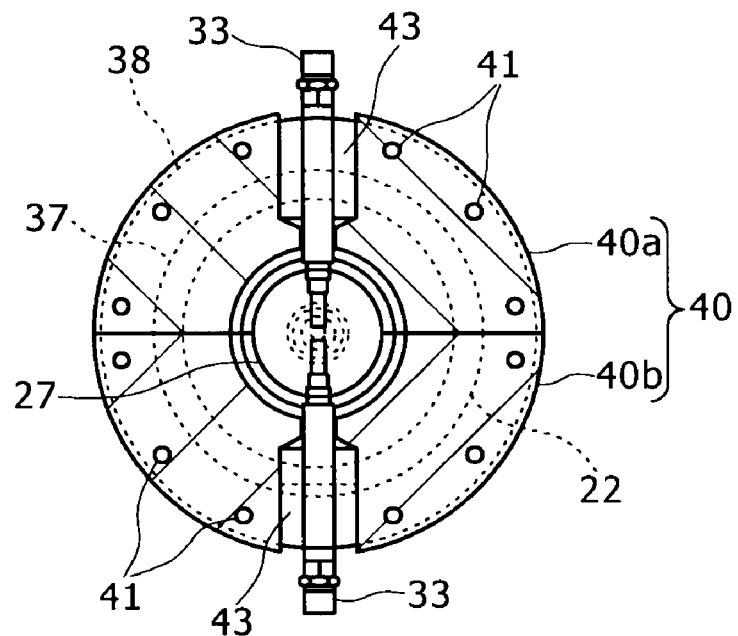
[FIG. 2] A sectional view by line II-II of FIG. 1.
Figure 3:
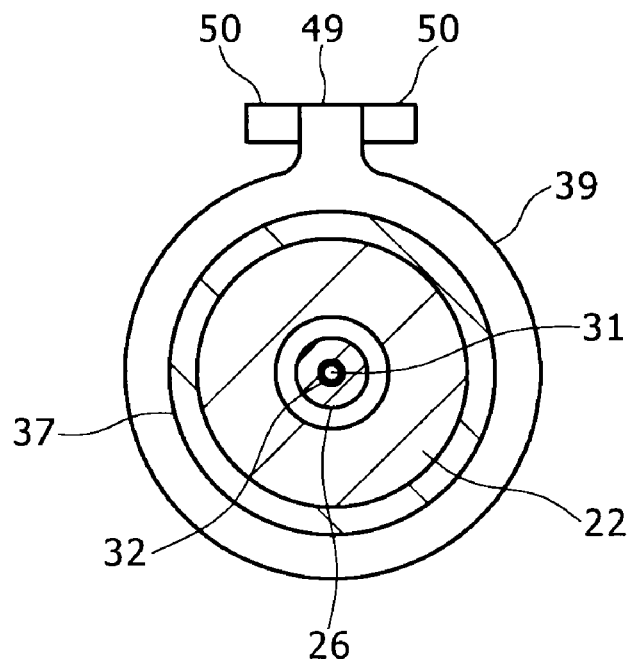
[FIG. 3] A sectional view by line III-III of FIG. 1.
Figure 4:
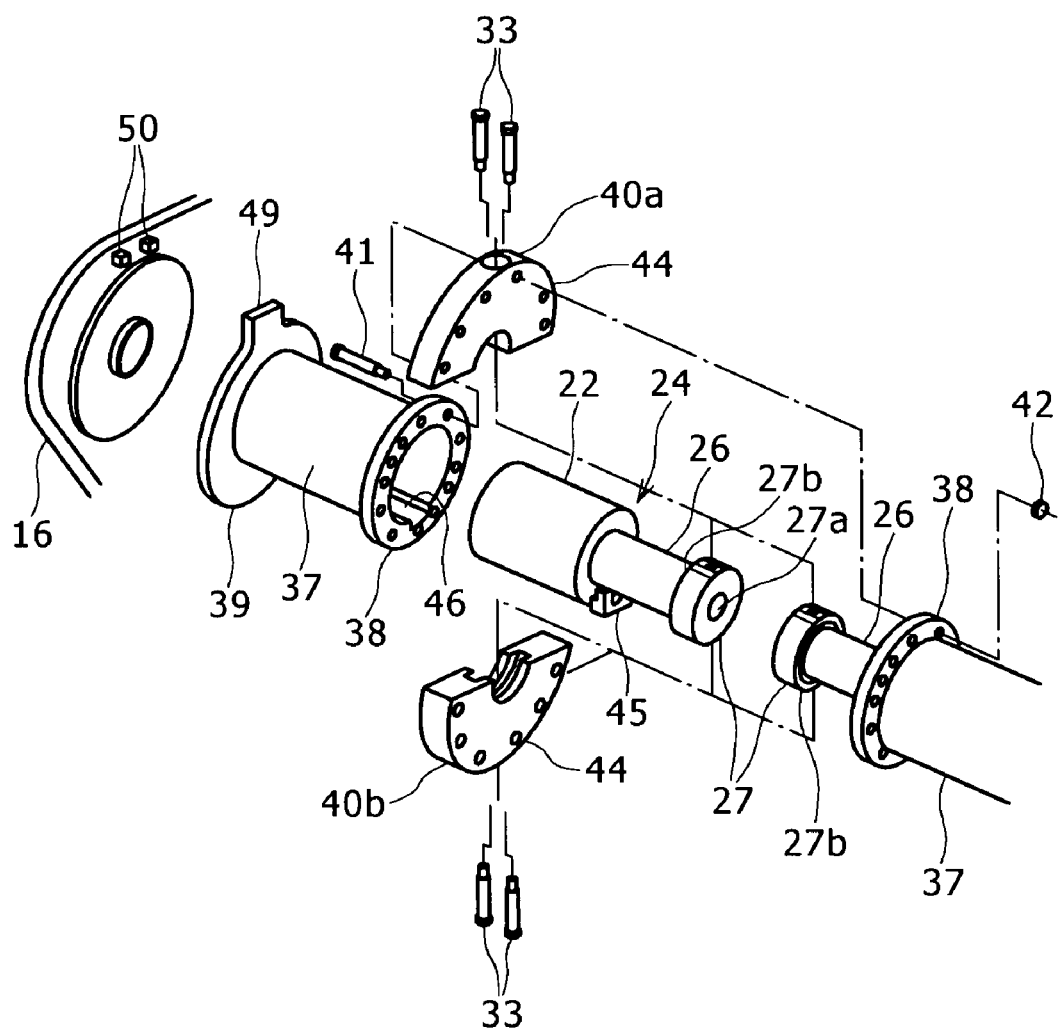
[FIG. 4] A partially exploded perspective view of the above device.

As shown in FIGS. 3 and 4, a projecting piece 49 is provided in a part of an outer periphery of the outer collar portion 39. Meanwhile, in an inner surface of the inner bracket 16, rotation preventing protrusions 50 are provided so as to be engaged with the projecting piece 49 in a state that the above projecting piece 49 is sandwiched from the both sides in the circumferential direction. Thereby, a position of the pin guide member 37 is fixed in the circumferential direction.

It should be noted that at the time of assembling, after press fitting the bushing, both the pin guide members 37 are inserted between the inner brackets 16 and 18, outer ends thereof are supported in the radial direction and hence rotation thereof is prevented. Then, inner ends thereof are combined and integrated with each other through the supporting plate 40.

As mentioned above, the inner ends of the both the pin guide members 37 are combined by the bolts and integrated with each other in a state that the supporting plate 40 detachable in the pin radial direction is intervened between the inner ends. Therefore, regarding to assembly of the pin guide members 37, it is possible to omit a troublesome work of press fitting and welding a flange of the bushing, machine work on a flange combining surface prior to the above and the like, which are required in the prior art shown in FIGS. 11 and 12.

The outer ends of the pin guide members 37 may only be supported in the pin radial direction. Therefore, there is only a need for a simple operation of not press fitting but simple convexo-concave fitting to the bushing 48.

It should be noted that although the rotation preventing protrusions 50 are welded to the inner brackets 16 and 18, high strength is not originally required. Therefore, an amount of welding is reduced and there is little need for considering welding distortion or the like.

Consequently, it is possible to reduce the number of process for the entire assembling work of the pin guide members 37 and simplify the work. Therefore, it is possible to realize improvement in an assembling property and cost reduction in a mass produced machine.

Meanwhile, it is possible to fix the positions of the pin guide members 37 in the circumferential direction with respect to the inner brackets 16 and 18 by the projecting pieces 49 and the rotation preventing protrusions 50. Therefore, in the case of the hydraulic pin type as in the present embodiment, there is especially no fear that the pin guide members 37 are rotated so that an unreasonable load is imposed on a hydraulic piping system for the hydraulic cylinders 24 or the like.

Further, the supporting plate 40 serving as both the connection member and a reaction force receiving member is formed in a half-divided shape with a pair of the ring bodies 40a and 40b in a semicircular shape. Therefore, it is possible to easily combine the rod ends (the reaction force transmitting portions 27) with the supporting plate 40.

Figure 5:
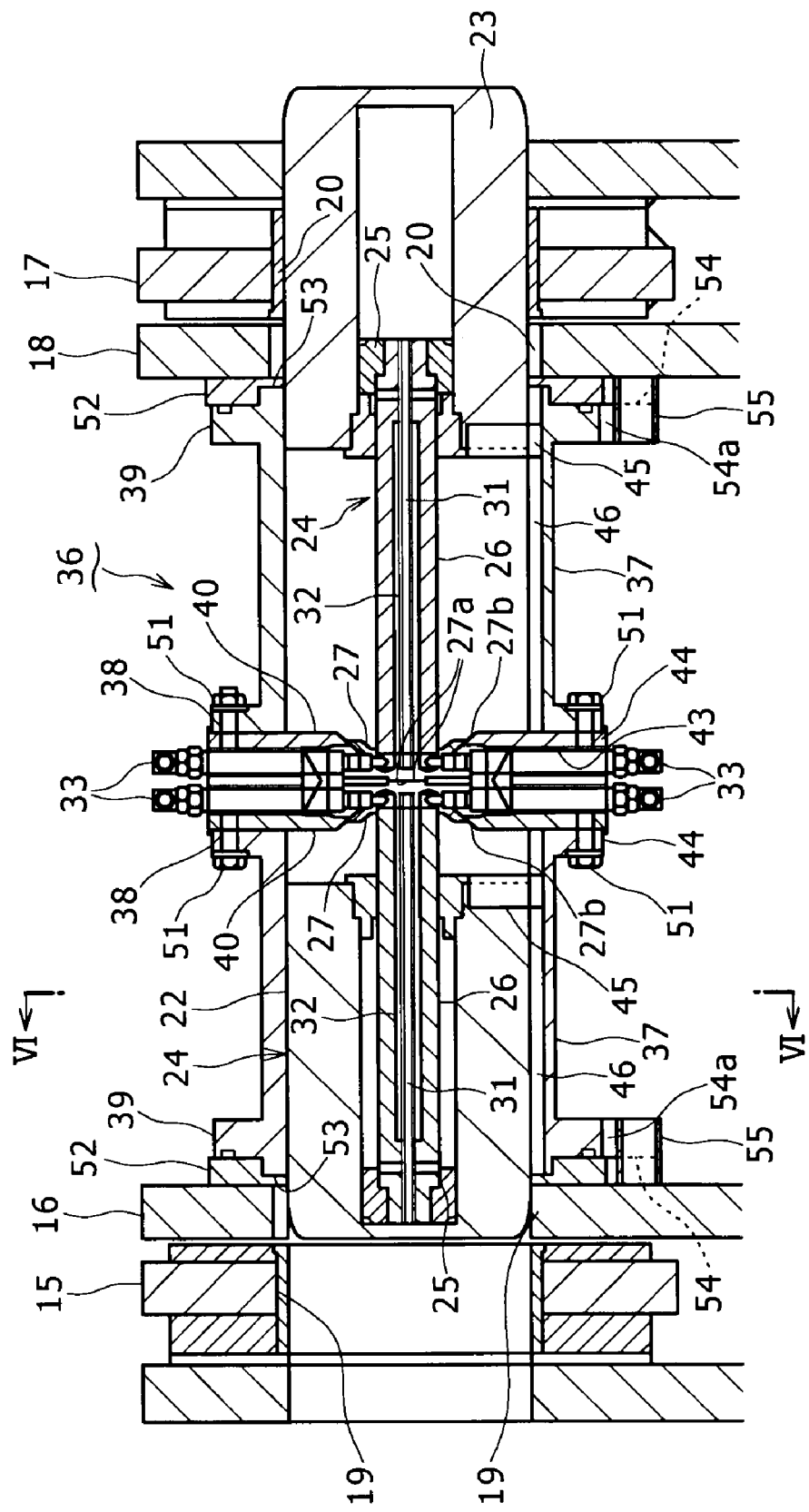
[FIG. 5] A sectional view of a pin connection device according to a second embodiment of the present invention.
Figure 6:
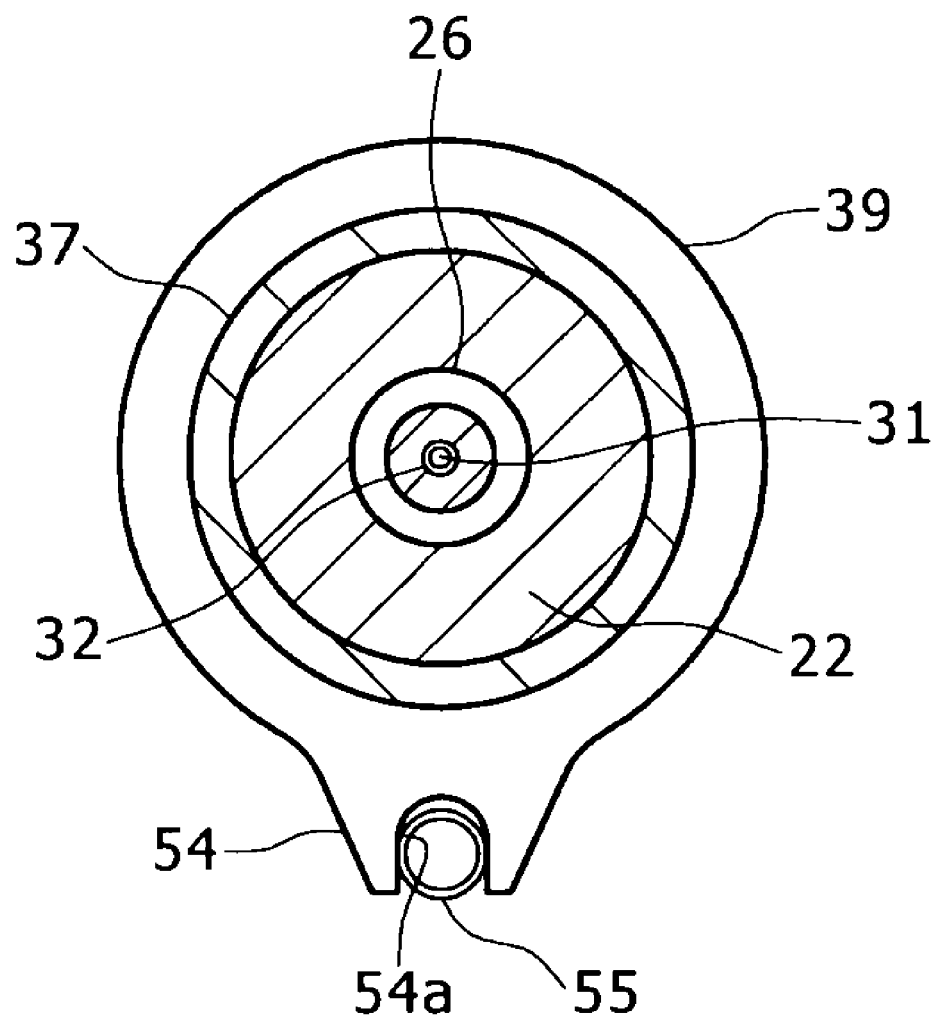
[FIG. 6] A sectional view by line VI-VI of FIG. 5.

Second Embodiment (Refer to FIGS. 5 and 6)

A description will only be given to a difference from the first embodiment.

Difference 1

In the first embodiment, both the pin guide members 37 and the supporting plate 40 are combined with each other by the through bolt 41. Meanwhile, in a second embodiment, both the pin guide members 37 are separately combined with the supporting plate 40 by bolts 51.

Even with the above configuration, the point that both the pin guide members 37 are combined and integrated with each other through the supporting plate 40 is basically the same as the first embodiment.

Difference 2

As the supporting means for supporting the pin guide member 37 in the pin radial direction, in the first embodiment, the bushings 48 are press fitted to the pin holes 19 and 20 of the inner brackets 16 and 18, and the outer ends (the fitting concave portions 47) of the pin guide members 37 are fitted to the bushings 48. Meanwhile, in the second embodiment, instead of the bushings 48, fitting members (female members) 52 are welded and fixed to the inner surfaces of the inner brackets 16 and 18, and fitting convex portions 53 provided in the outer ends of the pin guide members 37 are convexly and concavely fitted to the above fitting members 52 in the axial direction.

According to the above configuration, it is possible to omit the bushings 48 in the first embodiment and there is no need for the machine work on peripheral surfaces of the pin holes for press fitting the bushings. Therefore, the assembling property will be more improved.

Difference 3

Regarding to rotation preventing means, in the first embodiment, the projecting piece 49 provided on the pin guide member 37 side is sandwiched by a pair of the rotating preventing protrusions 50 provided on the inner bracket 16 side. Meanwhile, in the second embodiment on the contrary, a rotation preventing concave portion 54a is provided in a projecting piece 54 on the pin guide member 37 side, and axial shape protrusions 55 projectingly provided on the inner brackets 16 and 18 side are engaged with the above rotation preventing concave portion 54a.

It should be noted that the rotation preventing concave portion 54a is formed in a long hole shape elongating in the radial direction so as to allow an accidental error in assembly.

Figure 7:
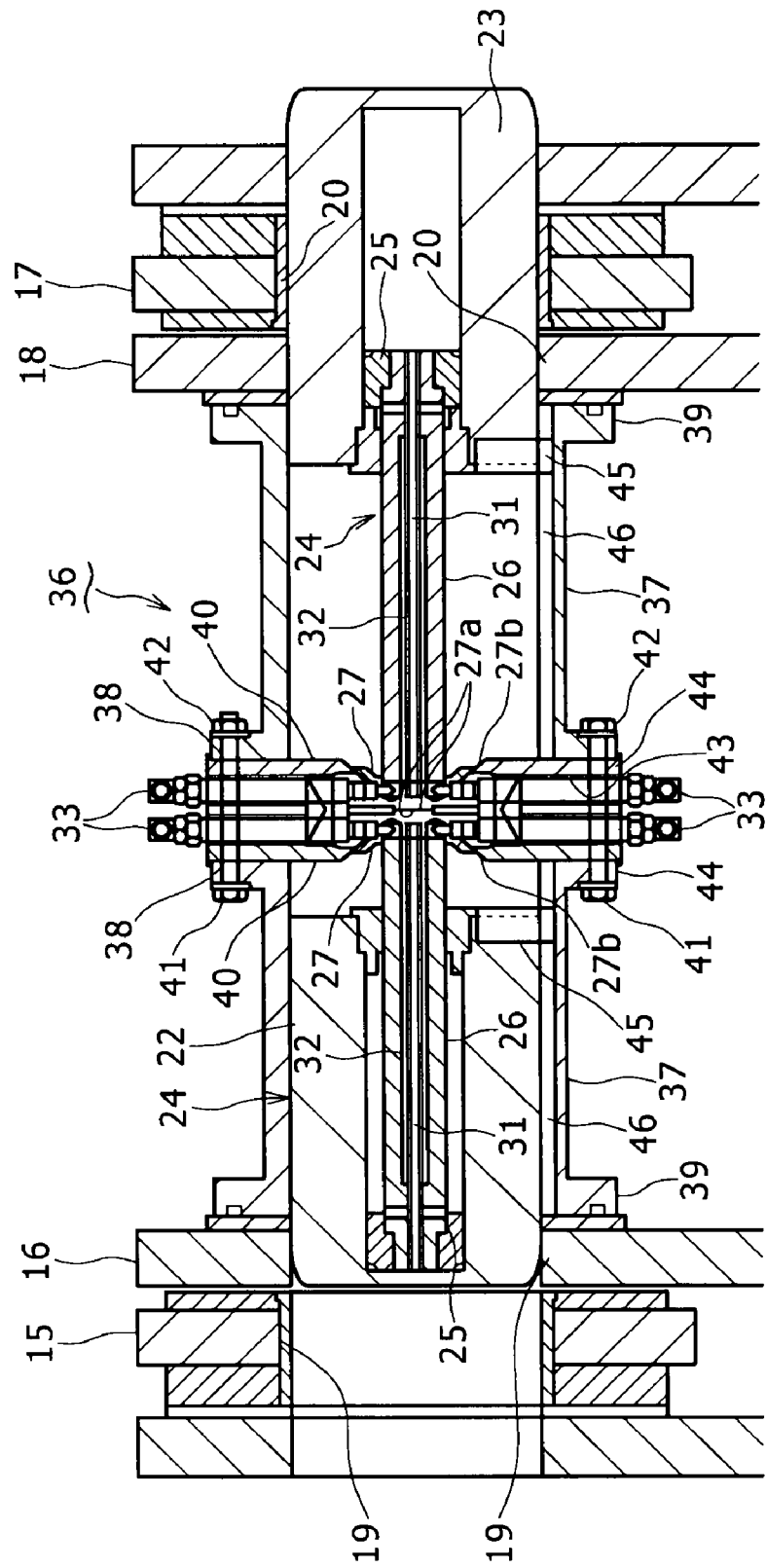
[FIG. 7] A sectional view of a pin connection device according to a third embodiment of the present invention.

Third Embodiment (Refer to FIG. 7)

As mentioned above, both the pins 22 and 23 and the pin holes 19 and 20 of the outer brackets 15 and 17 also function as the means for supporting the pin guide members 37 in the radial direction.

In a third embodiment, the outer ends of the pin guide members 37 are only faced to the inner surfaces of the inner brackets 16 and 18 in a sealing state, and the support in the pin radial direction is performed by the pin supporting part mentioned above.

It should be noted that although the rotation preventing means is not shown here, the rotation preventing means of the first embodiment or the second embodiment may be adopted according to need.

According to the above configuration, the number of parts and the number of process are further reduced so as to furthermore contribute to the improvement in the assembling property and the cost reduction.

Figure 8:
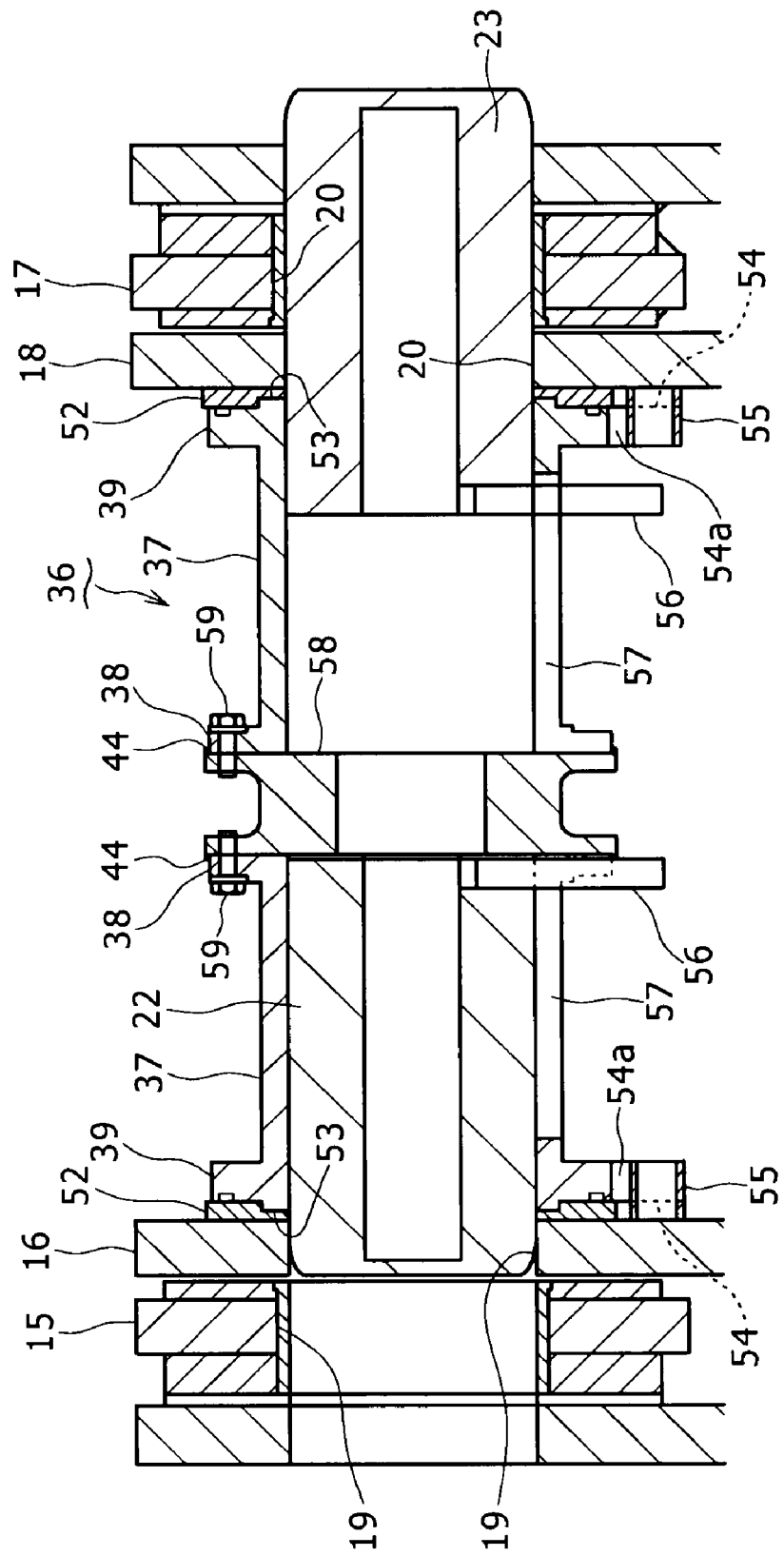
[FIG. 8] A sectional view of a pin connection device according to a fourth embodiment of the present invention.

Fourth Embodiment (Refer to FIG. 8)

The first to third embodiments show the case of applying the present invention to the hydraulic pin type in which the pins 22 and 23 are driven by the hydraulic cylinders 24. However, it is possible to apply the present invention to a manual pin type in which the operation is manually performed.

A fourth embodiment shows an application example to the manual pin type. In the present embodiment, the hydraulic cylinders are not used, and both the first and second pins 22 and 23 perform the stroke operation between both the insertion and removal positions by levers 56.

The levers 56 are guided to the exterior by lever ports (slots) 57 provided in peripheral walls of both the pin guide members 37 extending in the pin longitudinal direction.

In the present embodiment, both the pin guide members 37 are combined and integrated with each other by non-through type bolts 59 through a connection member 58 in a thick plate shape intervened between the inner collar portions 38.

The connection member 58 is formed in a half-divided shape as in the other embodiments (the half-divided state is not shown), and provided with the engagement edge portions 44 outwardly projecting in outer peripheral ends of both left and right side surfaces. The above engagement edge portions 44 are engaged with the outer peripheries of the inner collar portions 38 of the pin guide members 37 so as to position (center) in the radial direction.

Meanwhile, the present embodiment exemplifies the case of applying the supporting means for supporting the outer ends of both the pin guide members 37 in the pin radial direction and the rotation preventing means which are the same as the second embodiment (the same parts as FIG. 5 are given the same reference numerals, and a explanation thereof will be omitted). However, both the means may also be the same as the first embodiment.

Other Embodiment (1) The supporting plate 40 of the first to third embodiments and the connection member 58 of the fourth embodiment may be formed not in a half-divided shape but in one ring shape, when there is no problem in assembly.

(2) In the case where the outer ends of the pin guide members 37 are supported by the convex and concave fitting parts in the radial direction to the inner brackets 16 and 18 as in the first, second and fourth embodiments, the pins 22 and 23 may also be removed from the pin holes 19 and 20 of the inner brackets 16 and 18 at the removal position.

Figure 9:
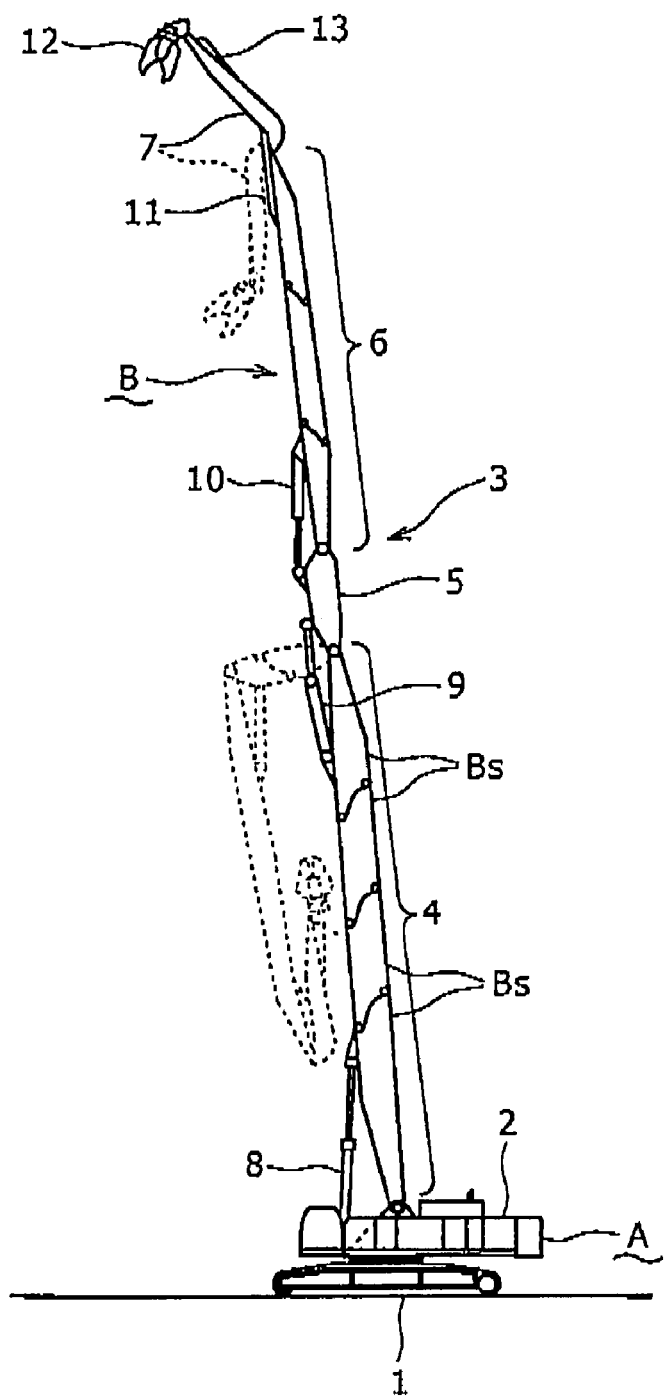
[FIG. 9] A schematic side view of a cannibalizing machine to which the present invention is applied.

(3) The present invention is not limited to a connection part between boom sections, but can be applied to an attachment part of a compression crushing device 12 to a front end of a boom in a cannibalizing machine shown in FIG. 9 (in the case where a bucket is attached instead of the compression crushing device 12, an attachment part of the bucket), attachment parts of boom cylinders 8 to 11, and an attachment part of a boom foot of a first boom 4. The present invention can be applied not only to the cannibalizing machine but also to attachment parts of an attachment and connection parts between members in various working machines such as a crane and an excavator.

Industrial Applicability

The present invention exhibits a useful effect of reducing the number of process in assembling a pin guide member so as to simplify a work.

The invention claimed is:

1. A pin connection device connecting two overlapped members, comprising:
a first connection portion provided on a first side of each of the two overlapped members to be connected to each other;
a second connection portion provided on a second side of each of the two overlapped members to be connected to each other, wherein said first and second connection portions are separated by a clearance;
pin holes provided in both said first and second connection portions;
first and second annular pin guide members provided side by side in the axial direction of the pin guide members, said pin guide members having inner ends opposing to each other, said pin guide members extending in said clearance between said first and second connection portions and having outer ends adjacent said first and second connection portions, respectively;
first and second pins respectively provided in said first and second pin guide members and arranged to move in opposite directions between a connection position wherein the pins are inserted into said pin holes and a disconnection position wherein the pins are removed from at least said pin holes of the outer ones of said two overlapped members;
a connection member provided between the opposed inner ends of the first and second annular pin guide members, the connection member comprising semi-annular bodies, wherein each of the semi-annular bodies has a first fixing portion at a first axial side thereof to be detachably fixed to said inner end of said first annular pin guide member in the pin radial direction, and a second fixing portion at a second axial side thereof to be detachably fixed to the second annular pin guide member in the pin radial direction;
fasteners extending through at least one of the inner end of said first annular pin guide member and the inner end of said second annular pin guide member, and at least partially into the connection member, such that the fasteners detachably fix the first fixing portion to the inner end of said first annular pin guide member, and the second fixing portion to the inner end of said second annular pin guide member; and
supporting means for supporting the outer ends of said pin guide members only in the pin radial direction with respect to said connection portions.

2. The pin connection device according to claim 1, wherein said supporting means is formed by convex portions provided at one of the inner side of one of said connection portions and the outer ends of said pin guide members, and concave portions provided in the other of the inner side of one of said connection portions and the outer ends of said pin guide members, wherein the convex portions are fitted to the concave portions in the pin axial direction and support both said pin guide members in the radial direction.

3. The pin connection device according to claim 1, further comprising rotation preventing means for fixing positions of said pin guide members in the circumferential direction with respect to said connection portions.

4. The pin connection device according to claim 3, wherein said rotation preventing means comprises a projecting piece provided in one of said pin guide members and said connection portions and a rotation preventing member provided in the other of said pin guide members and said connection portions so as to be engaged with the projecting piece in a state that a position of the projecting piece is fixed in the circumferential direction.

5. The pin connection device according to claim 1, further comprising lever ports extending in the pin longitudinal direction provided in peripheral walls of said pin guide members, and levers for manually operating said pins between the connection position and the disconnection position, the levers being guided from the lever ports to the exterior.

6. The pin connection device according to claim 1, further comprising first and second hydraulic cylinders adapted to drive said first and second pins separately, the hydraulic cylinders being provided coaxially side by side between said connection portions and having rods with opposing inner ends, such that a reaction force on one of the cylinders by the pins moving to the connection position is transmitted to the other cylinder by the opposing ends of the cylinders, while a reaction force on one of the cylinders by the pins moving to the disconnection position is transmitted to said pin guide members through said connection member.

7. The pin connection device according to claim 6, wherein said inner ends of said rods are combined with an inner peripheral part of said connection member in a ring shape in a state that the reaction force on the cylinder contracting side is transmittable to said connection member.

8. The pin connection device according to claim 7, further comprising oil passages for moving the pins provided in said hydraulic cylinders, and a pipe joint in said connection member and adapted to join the oil passages with external hydraulic pipes.

9. The pin connection device according to claim 7, wherein said outer ends of said first and second annular pin guide members opposing said first and second connection portions are supported in the pin radial direction with respect to said first and second connection portions without being fixed to said first and second connection portions.

10. The pin connection device according to claim 6, wherein cylinder tubes of said first and second hydraulic cylinders are respectively integrated with said pins.

\* \* \* \* \*